United States Patent [19]

Scaringe et al.

[11] Patent Number: 5,142,884
[45] Date of Patent: Sep. 1, 1992

[54] SPACECRAFT ADSORPTION THERMAL STORAGE DEVICE USING A VAPOR COMPRESSION HEAT PUMP

[75] Inventors: Robert P. Scaringe, Rockledge; Clyde F. Parrish, Melbourne; Lawrence R. Grzyll, Merritt Island, all of Fla.

[73] Assignee: Mainstream Engineering Corporation, Rockledge, Fla.

[21] Appl. No.: 648,828

[22] Filed: Feb. 1, 1991

[51] Int. Cl.⁵ .............................................. F24J 3/04
[52] U.S. Cl. ...................................... 62/324.4; 62/174; 62/498
[58] Field of Search ................ 62/324.1, 324.4, 480, 62/271, 269, 174, 498, 149

[56] References Cited

U.S. PATENT DOCUMENTS

| 2,359,595 | 10/1944 | Urban | 62/149 |
| 2,693,092 | 11/1954 | Labolle | 62/324.1 |
| 3,817,046 | 6/1974 | Aoki et al. | 62/18 |
| 4,270,358 | 6/1981 | Husain et al. | 62/506 X |
| 4,367,634 | 1/1983 | Bolton | 62/324.4 X |

FOREIGN PATENT DOCUMENTS

3322425 1/1985 Fed. Rep. of Germany ..... 62/324.4

Primary Examiner—Albert J. Makay
Assistant Examiner—William C. Doerrler
Attorney, Agent, or Firm—Evenson, Wands, Edwards, Lenahan & McKeown

[57] ABSTRACT

A vapor compression heat pump system and method employs thermal storage for adsorption of excess refrigerant under peak thermal load conditions, particularly for spacecraft use. The system can utilize a single compressor and optionally the adsorption bed in a radiator or dual compressors in which one compressor can always handle the base load and the other compressor is used for peak loads and for desorbing and cooling the adsorption bed.

40 Claims, 6 Drawing Sheets

WEIGHT OF MOLECULAR SIEVES 35.89 GRAMS

SPACECRAFT ADSORPTION THERMAL STORAGE DEVICE USING A VAPOR COMPRESSION HEAT PUMP

The invention was made with government support, and the government has certain rights in the invention.

BACKGROUND AND SUMMARY OF THE INVENTION

The present invention relates to an adsorption thermal storage device in a heat pump for augmenting heat rejection, operating over the 300° to 425° K. temperature range, and, more particularly, to a storage device and method incorporated into a spacecraft thermal-management/thermal-transport system for augmenting spacecraft heat rejection so as to be capable of storing more thermal energy than conventional phase change materials and also be lighter than pumped loop or vapor compression heat pump systems without thermal storage. That is, the present invention involves a heat-pump-adsorption storage device (HPASD) as part of a heat rejection system which provides significant thermal storage in a vapor compression heat pump.

Cyclic thermal loads require that a heating or cooling system be designed for the maximum load, or that a thermal storage device be installed to average the load if the temperature requirements are to be met. Many thermal management systems (heating, air conditioning, etc.) have very high peak-to-average thermal energy rejection duty cycles and are therefore prime candidates for thermal storage systems. However, these storage systems must be reliable and accommodate significant energy storage per unit mass of the storage system. Spacecraft applications have restrictions which include total system weight or volume, complexity, and reliability. It is often not desirable to increase the size of the primary system but this is usually the only effective technique, since thermal storage devices known today suffer from long-term performance problems. For example, phase change materials (PCM) exhibit incongruent melting; metal hydrides are heavy and they degrade due to fragmentation after repeated cycling. Other systems that depend on sensible heat storage are too large and too heavy.

Terrestrial applications use ice storage to handle large peak thermal loads found in churches and auditoriums; however, this method is slow and heavy. Spacecraft applications, which have cyclic thermal loads that must be rejected to space through a radiator system, present a major design problem. The spacecraft systems are very weight- and radiator-area-sensitive and at the same time have thermal loads that can range by a factor of 10 from base to peak. Current designs use PCMs that have the phase transition at the desired operating temperature. These PCMs have four major problems: (1) they are poor thermal conductors, and metal strips or ribbons are sometimes added to improve the heat transfer rate; (2) they tend to supercool and make temperature control very difficult; (3) they require a much larger radiator area to provide the needed cooling for recycling; and (4) salt systems melt incongruently and cause phase separation on repeated cycling.

At the 300° K. (a temperature that is appropriate for spacecraft thermal management applications), several solid-liquid PCMs exist. However, these materials are slow to respond, have low thermal conductivity in the solid phase (so heat removal from these materials is a problem), and/or they have poor thermal stability. The typical approach of using metallic fibers or fins within the material to increase the solid phase thermal conductivity has met with limited success and has resulted in significant specific mass increases. Problems related to thermal stability and long-term life have yet to be solved for many compounds (such as Glauber's salt). At higher power system storage temperatures, molten-salt-type phase change materials exist. These molten salts do not, however, melt in the 300° K. electronic cooler range. Gallium is a liquid metal with excellent thermal conductivity and stability in the 300° K. range but Gallium has a limited storage capability of only 80 kJ/kg.

The use of heat pumps alone have shown some improvement, since they can raise the heat-rejection temperature which makes the radiator more efficient, but the impact is small since the heat pump compressor must be sized for the maximum load. Several thermally driven heat pump configurations, including hermetically sealed Rankine-powered vapor-compression systems, hermetically sealed free-piston Stirling-powered vapor-compression systems, absorption systems, and chemical/mechanical heat pumps, have been considered for use in spacecraft heat rejection systems. The vapor compression heat pump system has, however, performance and weight advantages over the Stirling, Brayton, or chemical (adsorption or absorption) heat pump systems. A chemical/mechanical heat pump system incorporates advantages of both the chemical and the mechanical vapor compression systems and has the added advantage of no moving parts.

Typical radiation-hardened radiators currently weigh approximately 20 kg/m². The use of heat pumps requires additional electrical power which must be added to the heat pump system weight in addition to the weight of the radiator. Studies of terrestrial heat pumps, which were not designed to be lightweight, have shown that electrically driven terrestrial residential and commercial split-systems range in specific mass from 11 to 18 kg/kW-cooled. Actual spacecraft heat pumps have to be considerably lighter. For instance, a sliding vane rotary compressor Environmental Control Unit (ECU) for the LANTIRN electro-optical pod system has a specific mass of 3.8 kg/kW-cooled. Performance predictions have been developed for a scroll compressor ECU unit with specific mass estimates of 5.85 kg/kW-cooled. Representative calculations will demonstrate the area and weight savings achieved with the use of a heat pump. Radiative heat transfer in space can be accurately modeled, by using an effective space temperature of 227° K. Also, by assuming a typical radiator emissivity of 0.8, the heat rejection from a spacecraft radiator can be calculated from the Stefan-Boltzmann equation, $$q = \epsilon \sigma (T_{rad}^4 - T_s^4) \qquad [1]$$

where:
- q is the heat flux per unit area, W/m²
- $\sigma$ is the Stefan-Boltzmann constant, W/m²K
- $\epsilon$ is the emissivity of the radiator surface (0.8)
- $T_{rad}$ is the radiator temperature, K
- $T_s$ is the effective space temperature, 227° K.

Values of the heat flux for several radiator temperatures are shown in Table I.

TABLE I

| Radiator Heat Flux for Several Radiator Surface Temperatures | |
|---|---|
| Surface Temperature | Radiator Heat Flux |
| 300° K. | 247 W/m² |
| 320° K. | 560 W/m² |
| 360° K. | 777 W/m² |
| 375° K. | 1,358 W/m² |
| 425° K. | 45,240 W/m² |

Assuming a 10 kW cooling-requirement base-line system that does not use a heat pump and therefore uses a 300° K. radiator, the area required is 40.5 m². If an electrically-driven heat pump with methanol as the working fluid ($COP_c$ of 1.85, compressor efficiency of 0.6, and condenser outlet temperature of 375° K.) is used, then for a cooling requirement of 10 kW, the condenser energy rejection is 15.4 kW. It is useful to compare the savings in radiator area and total system weight that would result from the use of this heat pump system. The heat pump requires 5.4 kW of electrical energy. Assuming that the waste heat from the electrical power system is rejected from a high-temperature (1000° K.) radiator and assuming an 8% electrical power conversion efficiency, 62.1 kW of additional waste heat must be rejected at 1000° K. to supply this electrical energy. This translates into an additional 1000° K. radiator area requirement of 1.4 m².

The heat pump system will require 16.1 m² of radiator area to reject the 15.4 kW of energy at 375° K. Thus the heat pump results in a 37% reduction in the weight and a 60% reduction in the radiator area.

Figure 1:
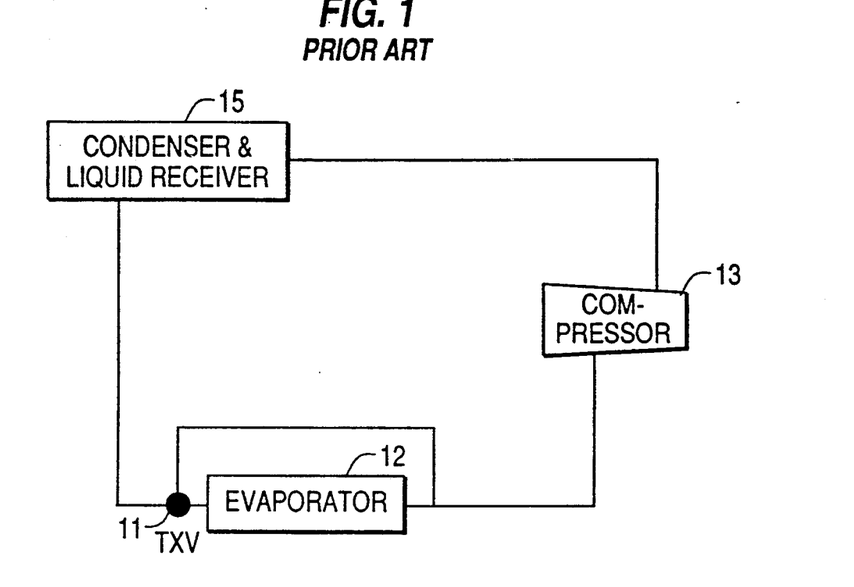
FIG. 1 is a schematic diagram of a basic vapor compression heat pump system.

FIG. 1 displays a basic vapor compression heat pump system. The basic operation starts at the evaporator where a thermal load is balanced by evaporative cooling of the refrigerant to maintain a constant evaporator temperature. The vapor is compressed and heated before discharge to the condenser. This increase in temperature translates to more efficient radiator operation, which can more than offset the increased mass of the heat pump and associated electrical equipment. For example, a heat pump with methanol as the refrigerant and a condenser outlet temperature of 375° K. can provide a 41% savings in mass and a 51% savings in radiator area over a pumped fluid loop.

When increased cooling is required, the thermostatic expansion valve (TXV) on the vapor compression heat pump system senses an increased evaporator exit superheated. This is because the refrigerant flow rate is insufficient for the heat load, so the refrigerant temperature rises. The TXV responds by opening and allowing an increased flow of refrigerant to the evaporator. A constant-speed compressor cannot accommodate the existing pressure lift and a new higher mass flow rate (because the TXV has opened), so the evaporator pressure rises (i.e., decreasing the compressor lift) and the increased flow rate is accommodated at the lower compressor lift. The new operating state point is at a higher evaporator pressure causing an associated higher evaporator temperature. Similarly, a decrease in cooling requirements leads to excess heat pump capacity. Of course, control systems are used to minimize the cold plate temperature variations, but if no thermal storage is used, the vapor compression heat pump must be sized for the worst-case, highest-capacity requirement.

Currently no thermal storage system can provide a significant improvement over the use of a larger fluid loop and radiator systems or vapor compression heat-pump-augmented spacecraft radiators. The difficulty with heat pump and fluid loop systems which have no thermal storage capabilities is encountered when they are used in thermal management applications having large differences between base and peak thermal loads. In the case of the heat-pump-augmented systems, the TXV senses an increased evaporator exit superheat when increased cooling is required. This occurs because the refrigerant flow rate is insufficient for the heat load so the refrigerant temperature rises. The TXV responds, as previously noted, by opening and allowing an increased flow of refrigerant to the evaporator.

Typical thermal transport system power dissipation requirements and duty cycles are base loads of 5 to 15 kW with 50 to 150 kW peak loads, and a duty cycle of 20 minutes at the peak load and 148 minutes at the base load.

It has been proposed previously to use a flexible expandable radiator as part of a vapor compression heat pump system. This approach makes, however, the heat pump reliability depend on a leak-free expandable radiator which has a number of potential mechanical drawbacks.

It is, therefore, an object of the present invention to solve the thermal storage problems by providing for efficient integration of refrigerant vapor storage within a vapor compression heat pump system.

It is yet another object of the present invention to provide a simple, compact method of storing heat pump cooling fluid.

In accordance with the device and method of the present invention, the heat pump adsorption storage device (HPASD), when full, would be discharged by using the hot exhaust compressor gases to raise the bed temperature and drive the refrigerant from the bed. This refrigerant would then be compressed, condensed, and stored in the liquid receiver for re-use. Availability of this approach is related to the ability of the storage device to rapidly adsorb or desorb the refrigerant.

Methanol makes a suitable working fluid for the 300° K. evaporator to 375° K. condenser application. When methanol is used as the working fluid, several adsorption materials are available. Synthetic alumino-silicates are made with a mixture of alkali methal hydroxides (e.g., Na or K) under pressure and high temperatures. The result is a crystalline structure with internal micropores capable of adsorbing polar molecules. Zeolites can adsorb 18.6 wt percent methanol at 325° K. and if the bed is heated to 425° K., the adsorption capacity is reduced to 2.6 wt percent. For this storage capacity, the vaporization of 1 kg of methanol at 300° K. would store 1773 kJ of energy, but for a 16 net wt percent methanol storage capacity, 6.25 kg of zeolite would be required. The energy storage capacity in this instance is approximately 245 kJ/kg (1773/7.25=245). The actual storage capacity for this system is 52 kJ/kg when all factors are considered.

BRIEF DESCRIPTION OF THE DRAWINGS

These and other objects, features and advantages of the present invention will become more apparent from the following detailed description of several preferred embodiments when taken in conjunction with the accompanying drawings wherein.

DETAILED DESCRIPTION OF THE DRAWINGS

FIG. 1 illustrates a basic vapor compression heat pump system upon which the HPASD of the present invention is initially based. The basic operation starts, as previously noted, at the evaporator when a thermal load is balanced by evaporative cooling of the refrigerant to maintain a constant evaporator temperature. The vapor is compressed and heated before discharge to the condenser. This increase in temperature translates to more efficient radiator operation which more than offsets the increased mass of the heat pump and associated electrical equipment.

Five hereinafter described vapor compression heat pump embodiments in accordance with the present invention provide thermal storage by adsorption of excess refrigerant generated under peak thermal load conditions. For terrestrial applications, the spacecraft-radiator would be replaced with a fin-tube radiator. Two embodiments (FIGS. 2 and 3) use a single compressor: the FIG. 2 embodiment makes no provision to handle the effect of the heat of adsorption on the storage capacity of the adsorption bed, and the FIG. 3 embodiment embeds the adsorption bed in a radiator. Three other embodiments (FIGS. 4 to 6) use two compressors along with a method to handle the excess energy generated by the heat of adsorption. In these dual compressor designs, one compressor is used to handle the base load, and the second compressor pumps the refrigerant from the adsorbent bed and cools the bed. During the period of peak thermal load, both compressors cool the cold plate; however, they are sized to handle only 30% of the capacity for the peak load. The excess refrigerant is diverted to the adsorbent bed, and at this point the embodiments differ.

Figure 2:
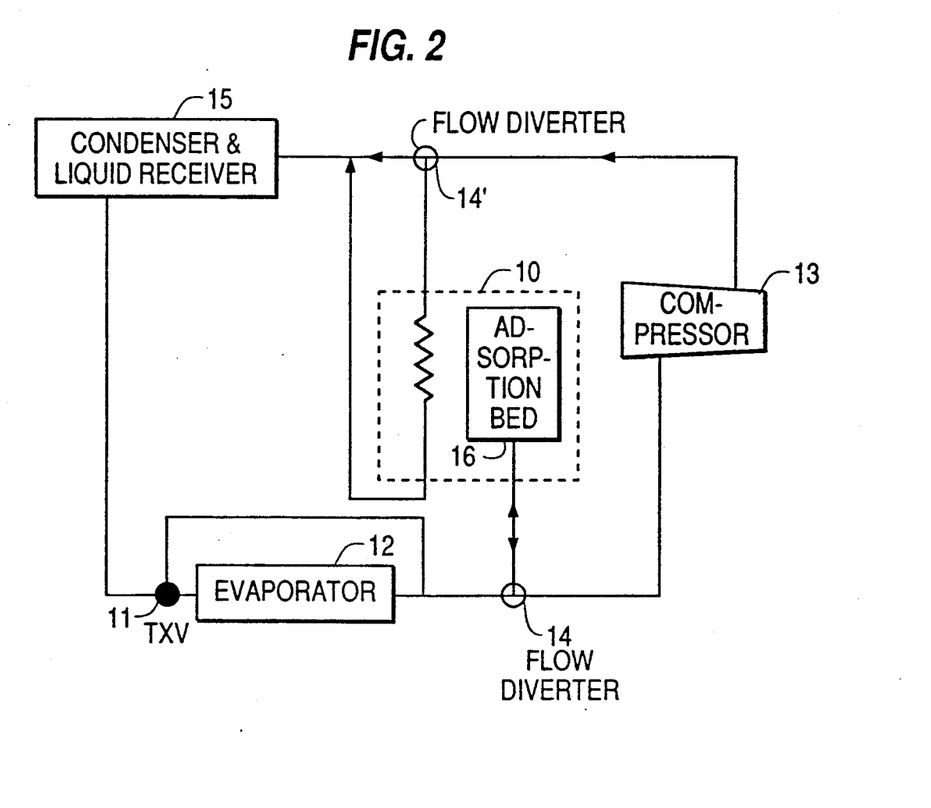
FIGS. 2 and 3 are schematic diagrams of alternative embodiments of vapor compression heat pumps using a single compression and adsorption thermal storage in accordance with the present invention.

A single compressor with adsorption thermal storage is shown in FIG. 2. This embodiment is based on the recognition that a single heat pump loop can provide both the base cooling for the off-peak thermal load and the capacity to desorb the refrigerant from the adsorption bed and to cool the bed. In this embodiment, when increased cooling is required, a thermostatic expansion valve (TXV) 11 on the vapor compression heat pump system senses an increased evaporator exit superheat because the refrigerant flow rate is insufficient for the heat load, so that the refrigerant temperature rises. The TXV 11 again responds by opening and allowing an increased flow of refrigerant to the evaporator 12. A constant-speed compressor 13 cannot accommodate the pressure lift and the new higher mass flow rate (because the TXV 11 has opened), so the evaporator pressure begins to rise. This pressure rise triggers a control valve 14 to divert some of the evaporator outlet flow to the storage device designated generally by the numeral 10 where the excess refrigerant vapor is adsorbed. If the pressure is still too high, the control valve 14 opens more and diverts a greater amount of refrigerant to the storage device 10. Similarly, if the flow to the compressor 13 is below its capacity, the evaporator pressure will begin to drop, signalling the control valve 14 to divert a smaller percentage to the storage device 10. The heat pump system would have excess liquid refrigerant stored in a liquid receiver 15.

The chemical storage device 10, when full, would be discharged by using the hot exhaust compressor gases to raise the bed temperature and drive the refrigerant from the bed 16. This refrigerant would then be compressed, condensed, and stored in the liquid receiver 15 or reuse.

The suitability of this device is related to the ability of the storage devices to rapidly adsorb or desorb the refrigerant. Physical adsorption systems are contemplated in the embodiment illustrated in FIG. 2. Although water might be considered for this application, its compressor outlet superheat quickly exceeds the temperature limits of a practical system. Methanol is one working fluid usable for the 300° K. evaporator to 375° K. condenser application. Several adsorption materials are available for use with methanol. Synthetic alumino-silicates are made with a mixture of alkali metal hydroxides (e.g., Na or K) under pressure and high temperatures. The result is a crystalline structure with internal micropores capable of adsorbing polar molecules. Zeolites can adsorb 18.6 wt percent methanol at 325° K.; if the bed is heated to 425° K., the adsorption capacity is reduced to 2.6 wt percent. This represents a storage capacity of 16 wt percent. For this methanol storage capacity, the vaporization of 1 kg of methanol at 300° K. would store 1773 kJ of energy, but for a 16 net wt percent methanol storage capacity, 6.25 kg of zeolite would be required. The specific mass of this storage is approximately 245 kJ/kg (1773/7.25=245) for this basic embodiment.

Figure 3:
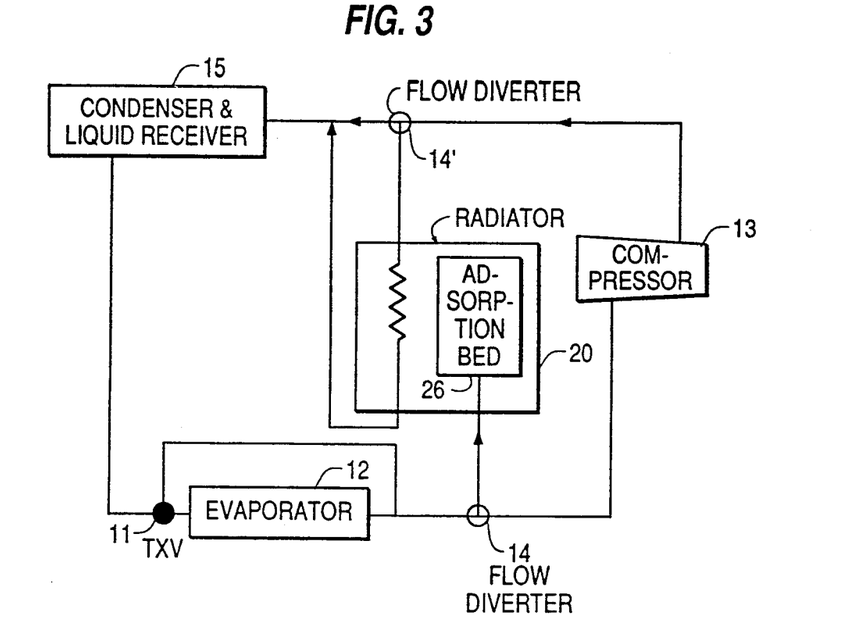

FIG. 3 shows another single compressor embodiment in which an adsorption bed 26 is incorporated in the radiator 20 in order to control the impact of the heat of adsorption on the adsorption capacity. The temperature of the bed is controlled by the size of the radiator 20 and the temperature will change depending upon the operation of the system, i.e., if the system is charging or discharging the bed. Otherwise, parts similar to those shown in FIGS. 1 and 2 are designated by the same numerals.

Figure 4:
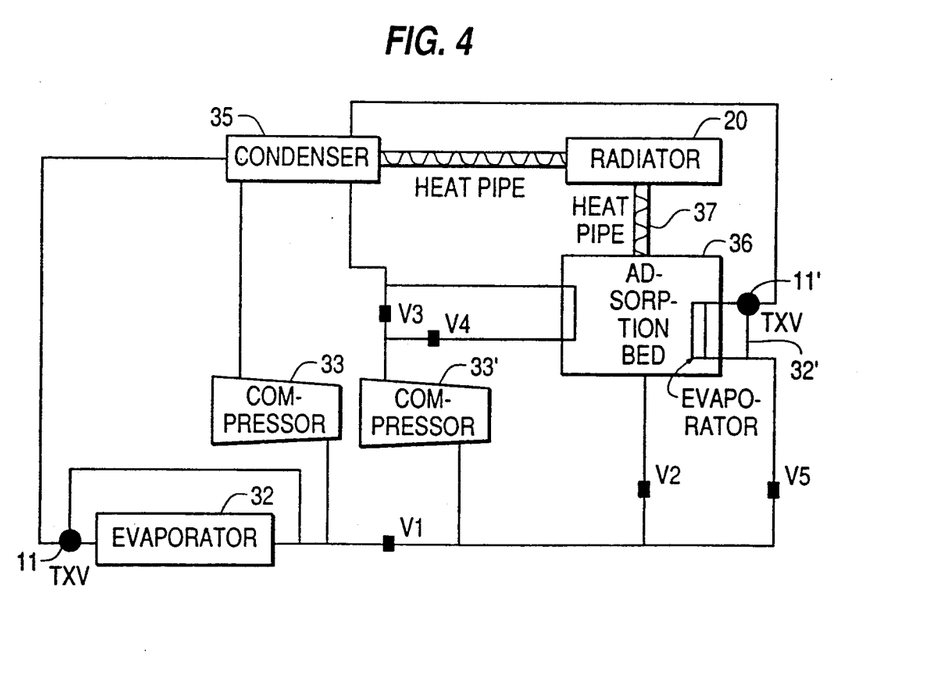
FIGS. 4 and 5 are schematic diagrams of alternative embodiments of vapor compression heat pumps with a dual compressor adsorption system with heat pipe thermal control in accordance with the present invention.

Another embodiment of the present invention is shown in FIG. 4 using a dual compressor adsorption system with heat pipe thermal control. One compressor 33 handles the base load, and the second compressor 33' pumps the refrigerant from the adsorption bed 36 and cools the bed. During the period of the peak load, both compressors 33, 33' cool a cold plate. They are sized, however, to be only 30% of the capacity for the peak load. The other 70% is sent to the adsorption bed 36, where a diode heat pipe 37 of known construction is used to transfer the heat of the adsorption bed to the radiator.

Based on the heat pipe selected, the temperature of the adsorption bed 36 can be controlled by the sizing of the heat pipe 37. A diode heat pipe is presently preferred for this application to prevent flow of heat from the radiator to the adsorption bed during the cooling cycle.

Operation of the design shown in FIG. 4 would be under three conditions: (1) operation during the peak load, (2) operation during the desorption cycle, and (3) operation during the cooling of the adsorption bed. When the operation is under condition (1), i.e., the peak load, valves V1, V2 and V3 are open, and valves V4 and V5 are closed. Refrigerant flows from the evaporator 32 and is pumped to the condenser 35 by both compressors 33, 33', and the excess flow is sent to the adsorption bed 36. For the 5-kW base load and 50 kW peak load example, vapor from 15 kW of the load would be sent to the condenser 35, and vapor from the remaining 35 kW would be sent to the adsorption bed 36. The thermal energy generated by the heat of adsorption that is above a set point, as determined by the temperature requirements of the adsorbent bed, is sent to the radiator via the heat pipe 37. When the operation is under condition (2), i.e., desorption of the bed, valves V1, V3 and V5 are closed, and valves V2 and V4 are open. Compressor 33 provides cooling for 5 kW base load. Compressor 33' pumps refrigerant from the adsorption bed 36, and the heat generated by the compressor 33' is used to heat the bed 36 by diverting the flow through the adsorption bed 36. During the final cooling operation, i.e., condition (3), valves V1, V2 and V4 are closed, and valves V3 and V5 are open. Again compressor 33 is used to maintain cooling of the base load. Compressor 33' is used to cool the adsorbent bed 36 by pumping refrigerant from the condenser 35 through a second evaporator 32' in the adsorption bed 36 and having a thermal expansion valve 11', and back to the condenser 35. This operation cools the adsorption bed 36 and returns the system to the initial conditions.

Figure 5:
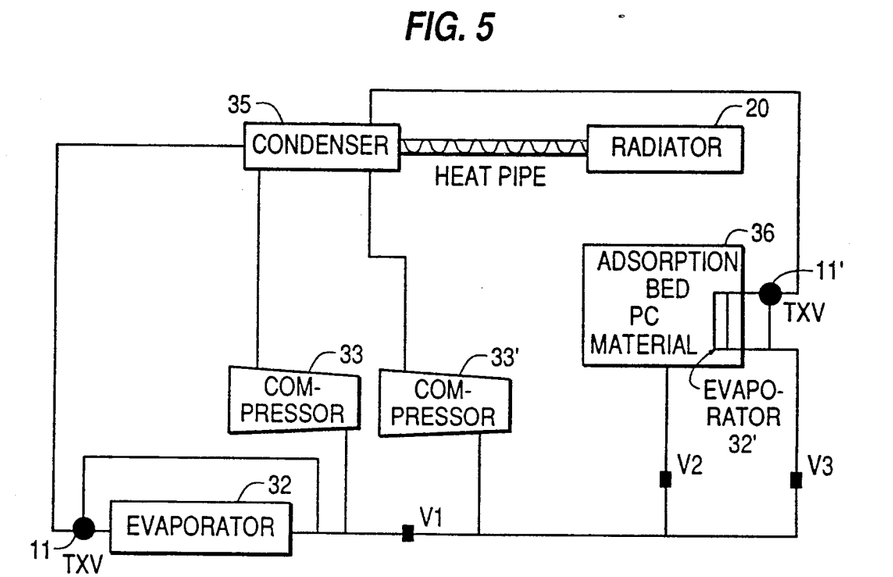

The two compressors used in the embodiment of FIG. 5 handle the heat resulting from the heat of adsorption. One compressor 33 handles the base load, and the second compressor 33' pumps the refrigerant from the adsorption bed 36 and cools the bed. During the period of the peak load both compressors 33, 33' are used to cool the cold plate; however, they are sized to be only 30% of the capacity for the peak load, and the excess refrigerant is diverted to the adsorption bed 36. The temperature of the adsorption bed is controlled by the use of PCMs to prevent the heat of adsorption from limiting the storage capacity of the bed. Organic PCMs can be used based on their melting points. This embodiment controls the bed temperature at the condenser outlet temperature. The quantity of phase change material required is controlled by the heat capacity of the refrigerant and adsorbent material. Desorption in this case relies only on the suction side of the compressor, and no heat is added to the bed during desorption to minimize the thermal load on the system.

Operation of the embodiment shown in FIG. 5 occurs under three conditions: (1) operation during the peak load, (2) operation during the desorption cycle, and (3) operation during the cooling of the adsorption bed. When the operation is under condition (1), the peak load, valves V1 and V2 are open, and valve V3 is closed. Refrigerant flows from the evaporator 32 and is pumped to the condenser 35 by both compressors 33, 33', and the excess vapor flows to the adsorption bed 36. The thermal energy generated by the heat of adsorption in excess of that required to heat the bed to the condenser outlet temperature is absorbed by the PCM. This is used to maintain the adsorption bed at the desired temperature. When the operation is under condition (2), desorption of the bed 36, valves V1 and V3 are closed, and valve V2 is open. Compressor 33 provides cooling for a 5-kW based load. Compressor 33' pumps refrigerant from the adsorption bed 36. During the final cooling operation, condition (3), valves V1 and V2 are closed, and valve V3 is open. Again compressor 33 is used to maintain cooling of the base load. Compressor 33' is used to cool the adsorption bed by pumping refrigerant from the condenser 35 through an evaporator with TXV 11' on the adsorption bed 36 and back to the condenser 35. This operation cools the adsorption bed 36 and returns the system to initial conditions.

Figure 6:
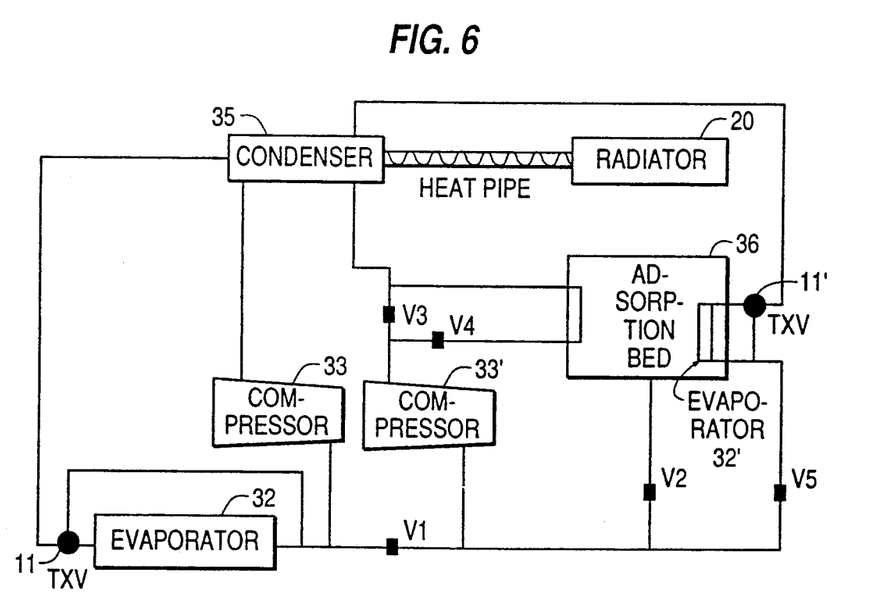
FIG. 6 is a schematic diagram of another embodiment of the present invention utilizing dual compressors with phase change thermal control and heated desorption.

FIG. 6 discloses another embodiment of the present invention utilizing dual compressors 33, 33' with phase change thermal control and heated desorption. Again two compressors 33, 33' are used to handle the heat that results from the heat of adsorption. One compressor 33 handles the refrigerant from the adsorption bed 36 and cools the bed. During the period of the peak load, both compressors 33, 33' are used to cool the cold plate; however, they are sized to be only 30% of the capacity for the peak load. The excess refrigerant is diverted to the adsorption bed 36. The temperature of the adsorption bed 36 is controlled by the use of PCMs. This is done to prevent the heat of adsorption from limiting the storage capacity of the bed. Organic PCMs have been selected to control the bed temperature at 310° K., a temperature that provides an adequate temperature differential to resolidify the phase change material. Desorption in this case relies on heat applied by the refrigerant vapor after passage through the compressor.

Operation of the system embodiment shown in FIG. 6 occurs under four conditions: (1) operation during the peak load, (2) operation during the bed heating cycle, (3) operation during the desorption cycle, and (4) operation during the cooling of the adsorption bed 36. When operation is under condition (1), the peak load, valves V1, V2 and V3 are open and valves V4 and V5 are closed. Refrigerant flows from the evaporator 32 and is pumped to the condenser 35 by both compressors 33, 33', and the excess flow is sent to the adsorption bed 36. The thermal energy generated by the heat of adsorption that is above 310° K. is controlled by the phase change material. When the operation is under conditions (2) and (3), i.e., heating and desorption of the bed, valves V1, V3 and V5 are closed and valves V2 and V4 are open. Compressor 33 provides cooling for the 4 kW base load. Compressor 33' pumps refrigerant from the adsorption bed, 36 and the heat generated by the compressor 33 heats the bed by diverting the flow through the adsorption bed. The bed is heated to the condenser outlet temperature to increase the capacity of the bed 36. During the final cooling operation, i.e., condition (4), valves V1, V2 and V4 are closed and valves V3 and V5 are open. Again, compressor 33 maintains cooling of the base load. Compressor 33' cools the adsorption bed 36 by pumping, refrigerant from the condenser 35 through an evaporator 32' with a 11' on the adsorption bed 36 and back to the condenser 35. This operation cools the adsorption bed and returns the system to initial conditions.

There are other factors that operate during the adsorption and desorption cycle. First, the adsorption process is exothermic, and the heat of adsorption is 1.5 to 2.0 times the latent heat of vaporization of the refrigerant. Second, the capacity of the adsorbent is temperature dependent; this capacity decreases with an increase in temperature. This additional heat may be retained by the bed or rejected directly to the radiator which is connected to the condenser. To remove the refrigerant from the bed, the heat of adsorption must be supplied. Therefore, one mode of operation would be to reject the heat of adsorption during the adsorption cycle to keep the temperature low and the corresponding capacity high. Then it would be necessary to supply this heat during the desorption cycle to reestablish the adsorption capacity of the bed. Another mode of operation would be to let the bed temperature float with the process, e.g., the temperature would increase during the adsorption process and decrease during the desorption process. In the first example the system would approach isothermal operating conditions, and in the second example it would approach adiabatic conditions.

Figure 7:
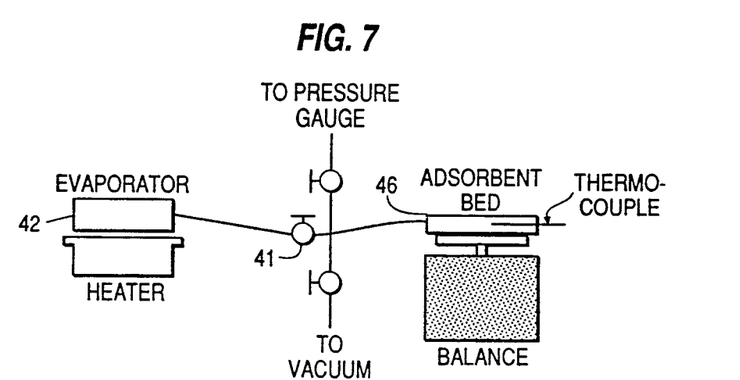
FIG. 7 is a schematic diagram of an apparatus for demonstrating the adsorption and desorption process.
Figure 8:
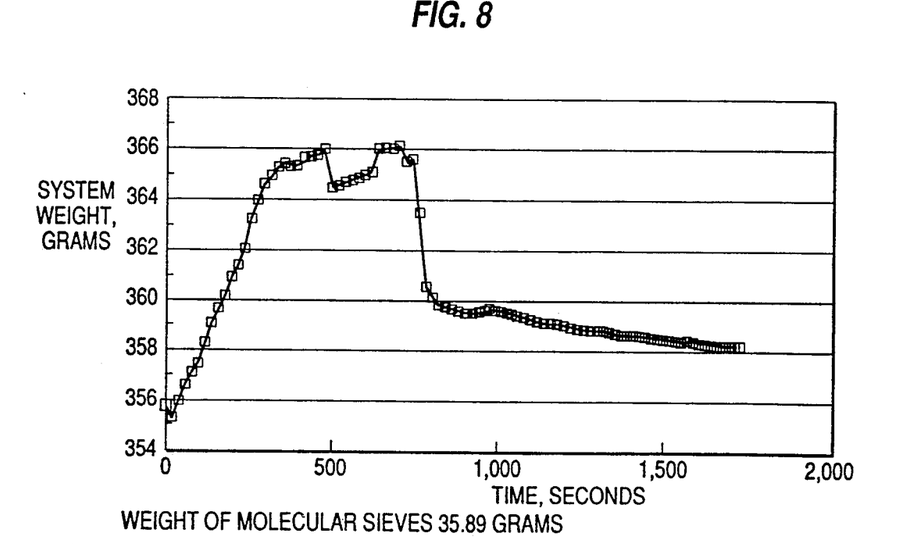
FIGS. 8 and 9 are graphs showing the results of adsorption and desorption of methanol on molecular sieves in the apparatus of FIG. 7.
Figure 9:
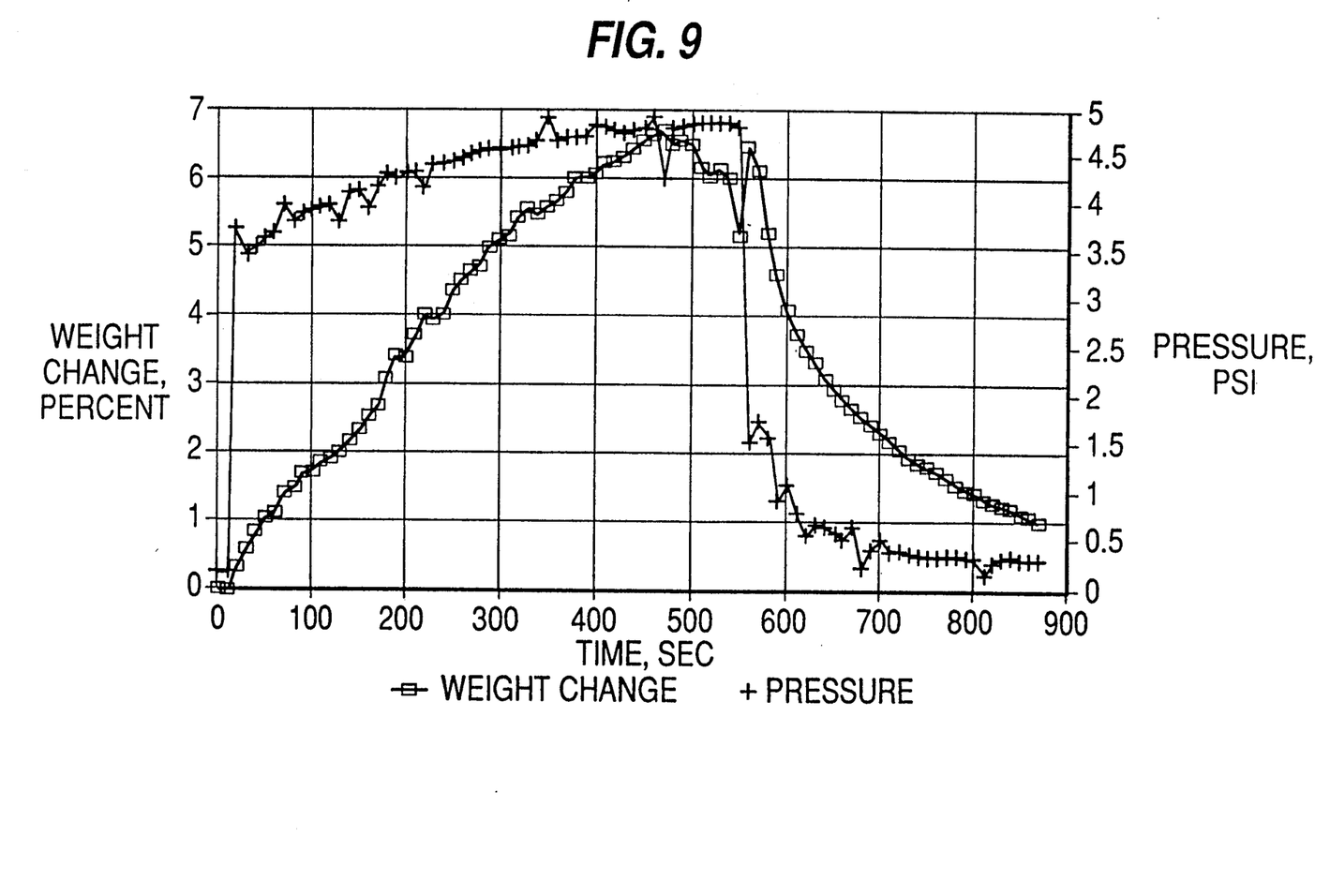

This adsorption and desorption process has been demonstrated by the apparatus shown in FIG. 7, and the results are shown in FIGS. 8 and 9 for the adsorption and desorption of methanol on molecular sieves. The heat pump operation is conventional and has not been included. The adsorption experiment was performed as follows. The refrigerant, in this case methanol, was added to one cylinder and molecular sieves added to the other cylinder. The system was evacuated and the valve 41 between the refrigerant and the adsorbent opened. The methanol vapor flowed from the first cylinder, which simulated the evaporator, 42 and was adsorbed on the molecular sieves 46 in the other cylinder. The temperature, weight and pressure was monitored. The weight increases by 30% and the temperature increases about 12 degrees in the adsorption process. Next the valve 41 between the refrigerant 42 and the adsorption bed 46 is closed and the bed was evacuated. This operation simulated the desorption process by the compressor. FIG. 9 illustrates that it is possible to store a refrigerant material on an adsorbent and remove it with reduced pressure.

There are a number of different refrigerant working fluids that can be used in combination with a large number of adsorbent materials to provide this weight and area reduction requirement. One exemplary system, as previously noted, is methanol as the refrigerant and molecular sieves as the adsorbent materials. Calculations for this system show a significant reduction in radiator area and total system weight.

Computer simulation studies also demonstrate that there should be sufficient time to desorb the refrigerant and cool the bed between peak load conditions. Temperatures higher than 400° K. usually require too much time to desorb and cool the bed.

Other refrigerants include: methanol, ethanol, acetone, water, ammonia, methyl chloride, ethyl chloride, sulfur dioxide, hydrogen sulfide, refrigerant R-12, refrigerant R-11, refrigerant R-22, refrigerant R-21, refrigerant R-113, refrigerant R-114, toluene, benzene, cis-2-butene, trans-2-butene, n-butane, 1-butene, m-xylene, n-pentane, n-hexane, n-heptane, and 1, 3-butadiene.

Other adsorbent materials include: molecular sieves, activated carbon, silica gel, metal halide salts (used as ammoniates, for example ammonia with calcium chloride to form an ammonia/calcium chloride complex), alumina, Fullers earth, and metal oxides.

The systems described above are not limited to spacecraft applications. For example, automotive air-conditioning systems have cyclic loads which result when traffic causes the vehicle either to move slowly or stop. No device has been attached to provide thermal storage for any automobile air-conditioning system. This system described above could extend the cooling capacity of an automotive system. In addition, the adsorbent bed could provide sensible cooling capacity after the automobile is stopped. This would keep the vehicle cool for quick stops.

Residential and commercial applications are also within the contemplation of the present invention by extending the capacity of the system to provide rapid cooling for a short period. This could be used in applications where cooling would be done in the late afternoon for homes that are not occupied during the daytime hours or for churches and auditoriums after a large meeting. This would be a potential energy savings device to provide the needed cooling only when the residence is occupied. Such applications would not be practical with conventional systems since they are not sized to provide this cooling capacity. In addition, the system of the present invention could also be used to match power plant demand curves by using the storage capacity to lower the load at periods of peak demand.

Figure 10:
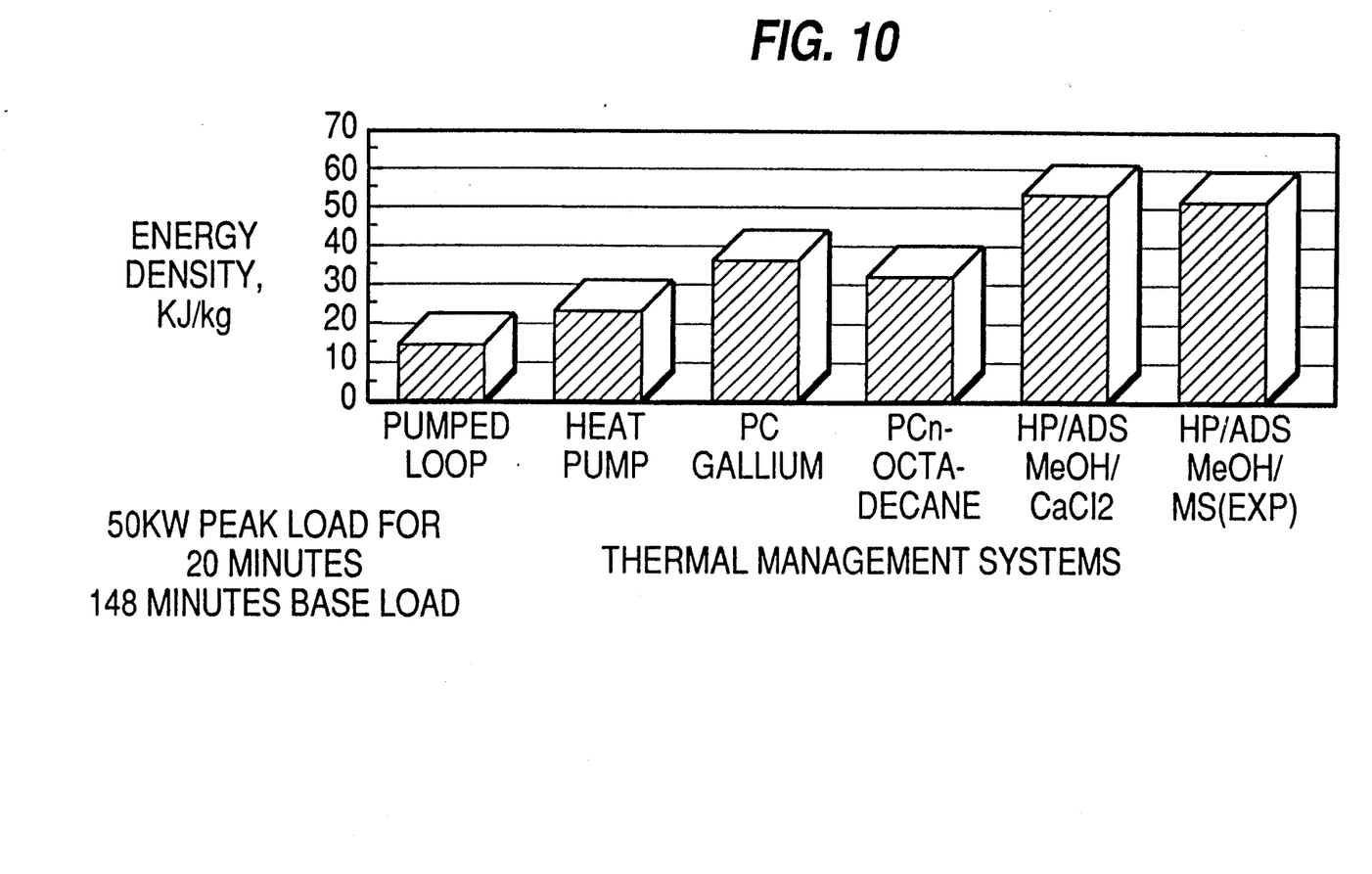
FIG. 10 is a graph showing the improved results achieved with the present invention.

FIG. 10 demonstrates the superiority of the present invention over the conventional systems, namely pumped loops, heat pumps, PCM Gallium and PCM n-Octadecane, in terms of energy storage expressed as energy density in kJ/kg. The thermal capacity of HPASD systems with methanol on calcium chloride as the adsorbent pair was 54.8 kJ/kg with a radiator area of 17 m$^2$ for a 50-kW peak thermal load. Values for a pumped loop were 15 kJ/kg with a 202-m$^2$ radiator area. Heat pumps with methanol as the working fluid have a storage capacity of 24 kJ/kg and a radiator area of 70 m$^2$. Phase change materials have values in the range of 12.6 kJ/kg (n-octadecane with a 30 degree delta T) to 37 kJ/kg (Gallium with a 10 degree delta T). The radiator areas for these phase change systems range from 225 to 43 m$^2$, respectively.

Several adsorbent-refrigerant pairs and in a HPASD device can provide significant thermal storage in a vapor compression heat pump. By way of summary:

1. The use of an adsorbent material in a vapor compression heat pump to provide thermal storage has been shown to provide four to five times the thermal energy capacity of a pumped loop system and two times the capacity of heat pumps or phase change materials.

2. The HPASD systems offer a significant reduction of radiator area over other systems.

3. The HPASD system should have good performance and reliability characteristics.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A vapor compression heat pump system, comprising:
   at least one compressor;
   a condenser and liquid receiver apparatus operatively connected with the at least one compressor;
   a system evaporator operatively associated with the at least one compressor and the apparatus so as to evaporate a liquid refrigerant supplied from the apparatus;

a thermal expansion valve operatively associated with the system evaporator; and means for thermal storage, including an adsorption bed, operatively arranged between one of the at least one compressor and the system evaporator, and the apparatus.

2. The system according to claim 1, wherein the at least one compressor, the apparatus and the system evaporator form a single heat pump sized and configured to provide base cooling for off-peak thermal load and a capacity to desorb the refrigerant from the adsorption bed and to cool the adsorption bed.

3. The system according to claim 1, wherein the thermal expansion valve is arranged to sense an increased system evaporation exit superheat and thereupon provide an increased flow of the refrigerant to the system evaporator.

4. The system according to claim 3, wherein the at least one compressor, the apparatus and the system evaporator form a single heat pump sized and configured to provide base cooling for off-peak thermal load and a capacity to desorb the refrigerant from the adsorption bed and to cool the adsorption bed.

5. The system according to claim 1, wherein the means includes a flow diverter valve between an outlet of the system evaporator and an inlet of the at least one compressor.

6. The system according to claim 5, wherein the thermal expansion valve is arranged to sense an increased system evaporator exit superheat and thereupon provide an increased flow of the refrigerant to the system evaporator, and the vapor flow diverter valve is configured to be actuated to divert excess refrigerant to the thermal storage means upon the occurrence of the increased flow in dependence on the magnitude of system evaporator pressure.

7. The system according to claim 6, wherein the at least one compressor, the apparatus and the system evaporator form a single heat pump sized and configured to provide base cooling for off-peak thermal load and a capacity to desorb the refrigerant from the adsorption bed and to cool the adsorption bed.

8. The system according to claim 5, wherein the means includes a second flow diverter valve between an outlet of the compressor and an inlet of the apparatus and configured selectively to divert hot exhaust compressor gases to the thermal storage means, when full, and drive the refrigerant from the adsorption bed to the apparatus where the refrigerant is compressed, condensed and stored.

9. The system according to claim 8, wherein the thermal expansion valve is arranged to sense an increased system evaporator exit superheat and thereupon provide an increased flow of the refrigerant to the system evaporator, and the vapor flow diverter valve is configured to be actuated to divert excess refrigerant to the thermal storage means upon the occurrence of the increased flow in dependence on the magnitude of system evaporator pressure.

10. The system according to claim 9, wherein the at least one compressor, the apparatus and the system evaporator form a single heat pump sized and configured to provide base cooling for off-peak thermal load and a capacity to desorb the refrigerant from the adsorption bed and to cool the adsorption bed.

11. The system according to claim 1, wherein the refrigerant is methanol.

12. The system according to claim 11, wherein the adsorption bed comprises synthetic alumino-silicates containing a mixture of alkali metal hydroxides.

13. The system according to claim 12, wherein the at least one compressor, the apparatus and the system evaporator form a single heat pump sized and configured to provide base cooling for off-peak thermal load and a capacity to desorb the refrigerant from the adsorption bed and to cool the adsorption bed.

14. The system according to claim 13, wherein the means includes a flow diverter valve between an outlet of the system evaporator and an inlet of the at least one compressor.

15. The system according to claim 14, wherein the thermal expansion valve is arranged to sense an increased system evaporator exit superheat and thereupon provide an increased flow of the refrigerant to the system evaporator, and the vapor flow diverter valve is configured to be actuated to divert excess refrigerant to the thermal storage means upon the occurrence of the increased flow in dependence on the magnitude of system evaporator pressure.

16. The system according to claim 15, wherein the means includes a second flow diverter valve between an outlet of the compressor and an inlet of the apparatus and configured selectively to divert hot exhaust compressor gases to the thermal storage means, when full, and drive the refrigerant from the adsorption bed to the apparatus where the refrigerant is compressed, condensed and stored.

17. The system according to claim 1, wherein the thermal storage means is provided in a radiator.

18. The system according to claim 1, wherein the at least one compressor consists of two compressors with one of the compressors configured to operate at a base load and the other of the compressors configured to pump the refrigerant from the adsorption bed and thereby cool the adsorption bed.

19. The system according to claim 18, wherein a radiator is operatively connected with the thermal storage means by a first heat pipe which prevents heat flow from the radiator to the adsorption bed during cooling of the bed and with the apparatus by a second heat pipe.

20. The system according to claim 19, wherein valve means are provided for supplying, during a peak load, refrigerant vapor from the system evaporator to the apparatus via the compressors and any excess refrigerant vapor to the thermal storage means, for desorbing the adsorption bed, with the one compressor providing cooling for the base load and the other compressor pumps the refrigerant from the adsorption bed to the apparatus and heating the bed, and for cooling the adsorption bed.

21. The system according to claim 20, wherein the thermal control means includes an evaporator arranged to be selectively connected between the apparatus and the other compressor by the valve means during cooling of the adsorption bed.

22. The system according to claim 18, wherein a radiator is connected to the apparatus via a heat pipe.

23. The system according to claim 22, wherein the adsorption bed includes phase-change material for absorbing thermal energy in excess of that thermal energy required to heat the adsorption bed to an outlet temperature of the apparatus.

24. The system according to claim 23, wherein the thermal control means includes an evaporator arranged to be selectively connected during cooling of the adsorption bed between the apparatus and the other compressor by valve means configured to permit flow of the refrigerant vapor from the system evaporator to the apparatus via the two compressors during peak load with excess refrigerant vapor to the adsorption bed, to permit desorption of the bed with the one compressor providing cooling for a base load and the other compressor pumping refrigerant from the adsorption bed to the apparatus, and to permit cooling of the adsorption bed with the one compressor providing cooling for the base load and the other compressor cooling the adsorption bed by pumping the refrigerant from the apparatus through the evaporator in the thermal storage means.

25. The system according to claim 23, wherein the thermal control means includes an evaporator arranged to be selectively connected during cooling of the adsorption bed between the apparatus and the other compressor by valve means configured to permit flow of the refrigerant vapor from the system evaporator to the apparatus via the two compressors during peak load with excess refrigerant to the adsorption bed, to permit heating and desorption of the adsorption bed with the one compressor providing cooling for a base load and the other compressor pumps the refrigerant from the adsorption bed to the apparatus with thermal energy generated by the other compressor heating the adsorption bed to an outlet temperature of the apparatus, and to permit cooling of the adsorption bed, with the one compressor cooling the base load and the other compressor pumping the refrigerant from the apparatus through the evaporator on the thermal storage means.

26. A cooling method, comprising the steps of:
evaporating refrigerant through a system evaporator of a vapor compressor heat pump system;
passing a portion of refrigerant vapor from the system evaporator to at least on compressor for compressing the vapor and supplying same to a condenser/liquid receiver apparatus;
passing the remaining portion of the refrigerant vapor from the system evaporator to a thermal storage means including an adsorption bed; and
selectively desorbing and cooling the adsorption bed such that base cooling is provided for off-peak thermal loads and the system has the capacity to desorb the refrigerant in the adsorption bed and cool the bed.

27. The cooling method according to claim 26, wherein the step of evaporating includes sensing increased system evaporator exit superheat and thereupon increasing flow of the refrigerant to the system evaporator.

28. The cooling method according to claim 27, wherein the step of passing the remaining portion includes a further diversion of excess refrigerant vapor upon the occurrence of the increased flow in dependence on the magnitude of system evaporator pressure.

29. The cooling method according to claim 28, wherein the step of selectively desorbing comprises diverting flow of the hot exhaust refrigerant gases from the at least one compressor to the thermal storage means when full to drive the refrigerant from the adsorption bed.

30. The cooling method according to claim 29, wherein the thermal storage means is arranged in a radiator.

31. The cooling method according to claim 26, wherein the step of passing the portion of the refrigerant vapor comprises operating one of the at least one compressors to cool a base load and operating another of the compressors to pump the refrigerant from the adsorption bed.

32. The cooling method according to claim 26, wherein the step of cooling the bed includes communicating the thermal storage means to a radiator through a heat pipe such that heat is prevented from flowing from the radiator to the adsorption bed, and communicating the radiator to the apparatus through a second heat pipe.

33. The cooling method according to claim 31, wherein the step of passing the portion of the refrigerant includes supplying refrigerant vapor from the system evaporator to the apparatus via the compressors during a peak load, the step of desorbing includes providing cooling for a base load with the one compressor and pumping the refrigerant from the adsorption bed to the apparatus with the another compressor.

34. The cooling method according to claim 33, wherein the step of cooling the bed includes passing the refrigerant from the apparatus through an evaporator in the thermal storage means.

35. The cooling method according to claim 34, wherein the step of cooling the bed includes communicating the thermal storage means to a radiator through a heat pipe such that heat is prevented from flowing from the radiator to the adsorption bed, and communicating the radiator to the apparatus through a second heat pipe.

36. The cooling method according to claim 34, wherein the step of passing the remaining portion of the refrigerant vapor includes absorbing thermal energy with a phase-change material in excess of that thermal energy required to heat the adsorption bed to an outlet temperature of the apparatus.

37. The cooling method according to claim 36, wherein the apparatus is connected to a radiator via a heat pump.

38. The cooling method according to claim 36, wherein the step of cooling the bed includes communicating the thermal storage means to a radiator through a heat pipe such that heat is prevented from flowing from the radiator to the adsorption bed, and communicating the radiator to the apparatus through a second heat pipe.

39. The cooling method according to claim 26, wherein the refrigerant is selected from a group consisting of methanol, ethanol, acetone, water ammonia, methyl chloride, ethyl chloride, sulfur dioxide, hydrogen sulfide, refrigerant R-12, refrigerant R-11, refrigerant R-22, refrigerant R-21, refrigerant R-113, refrigerant R-114, toluene, benzene, cis-2-butene, trans-2-butene, n-butane, 1-butene, m-xylene, n-pentane, n-hexane, n-heptane, and 1, 3-butadiene.

40. The cooling method according to claim 26, wherein the adsorption bed includes a material selected from the group consisting of molecular sieves, activated carbon, silica gel, metal halide salts, alumina, Fullers earth, and metal oxides.

* * * * *